(12) United States Patent
Xue et al.

(10) Patent No.: US 7,702,348 B2
(45) Date of Patent: Apr. 20, 2010

(54) METHOD OF DIGITAL TRUNKED COMMUNICATION SYSTEM FAST CALL SETUP

(75) Inventors: Yuhong Xue, Shenzhen (CN); Yingnan Liu, Shenzhen (CN); Jinlong Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 635 days.

(21) Appl. No.: 11/570,387

(22) PCT Filed: Dec. 29, 2004

(86) PCT No.: PCT/CN2004/001568

§ 371 (c)(1),
(2), (4) Date: Dec. 11, 2006

(87) PCT Pub. No.: WO2005/122599

PCT Pub. Date: Dec. 22, 2005

(65) Prior Publication Data

US 2008/0161032 A1 Jul. 3, 2008

(30) Foreign Application Priority Data

Jun. 12, 2004 (CN) .......................... 2004 1 0027626

(51) Int. Cl.
*H04B 7/00* (2006.01)
*H04M 3/42* (2006.01)
*H04W 4/00* (2009.01)

(52) U.S. Cl. ..................... 455/519; 455/517; 455/416; 455/426.2

(58) Field of Classification Search ............... 455/517, 455/518, 519, 521, 426.1, 416, 426.2
See application file for complete search history.

(56) References Cited

U.S. PATENT DOCUMENTS

| 7,453,837 | B2 * | 11/2008 | Jiang et al. ................. 370/320 |
| 7,586,882 | B2 * | 9/2009 | Sivalingham et al. ....... 370/335 |
| 2003/0119539 | A1 * | 6/2003 | Needham et al. ............ 455/518 |

FOREIGN PATENT DOCUMENTS

| EP | 1395071 | 3/2004 |
| WO | 02093953 A1 | 11/2002 |
| WO | 03017621 A1 | 2/2003 |

* cited by examiner

*Primary Examiner*—Tilahum Gesesse
(74) *Attorney, Agent, or Firm*—Darby & Darby

(57) ABSTRACT

The present invention discloses a method of fast call setup in digital trunking communication system, including: the terminal user initiating a PTT call; the base station receiving said PTT call request, assigning channel resource for the call, establishing forward service channel according to the distribution of channel, transmitting an empty frame on the forward service channel and at the same time transmitting an extended channel assignment message to specify the service channel assigned for the terminal; after receiving the extended channel assignment message, the terminal user opening the receiver to track and acquire the forward service channel, and at the same time transmitting one or more prefix-frame on the reverse service channel or reverse pilot channel; the base station or the terminal performing the operation of acquisition of service channel, if the acquisition succeeds, the call setup is successful, if the acquisition fails, the call setup is failed and enters release flow. The method of the present invention adopts a mode of overlapping of signaling handshake and channel acquisition, so as to advance the signaling handshake, reduce call accessing time, and realize fast call setup.

8 Claims, 2 Drawing Sheets

METHOD OF DIGITAL TRUNKED COMMUNICATION SYSTEM FAST CALL SETUP

CROSS-REFERENCE TO RELATED PATENT APPLICATION

This patent application claims the priority of PCT application PCT/CN2004/001568 titled "A METHOD OF DIGITAL TRUNKED COMMUNICATION SYSTEM FAST CALL SETUP", the teachings and disclosure of which are hereby incorporated by reference in their entireties.

TECHNICAL FIELD

The present invention relates to a method of establishing call in mobile communication system, especially relates to a method of fast call setup in mobile trunking communication system based on CDMA (Code Division Multiplex Access) standard.

BACKGROUND ART

Under the promotion of the increasingly diverse social demands, the mobile communication technology has developed from analog communication system to the current widely used second generation mobile communication system and 2.5 generation mobile communication system, and until the third generation mobile communication system which will be employed in a wide range in the near future. The development of mobile communication technology not only meets the demands of people on voice service, but also effectively meets the demands for the value-added services including the video, audio and interaction of real-time multimedia services, thereby the mobile communication system plays a more and more important role in people's life and work. Among the above, the trunking communication has increasingly become an indispensable service, the digital trunking system is an important branch of the mobile communication system, and is a special mobile communication system for multiple users sharing and dynamically utilizing a group of wireless channels.

The method of realizing trunking services in CDMA2000 system includes two types: the group call and the private call, which are important service features of the trunking system. The group call means that a single user can talk with all the other users in the group simultaneously in a permitted time. When one user is talking, all the other users in the group must listen to him. Once a user in the group pushes the PPT (Push To Talk) button, other users in the group whose priority level is same with that of the user pushing the PPT button can not break in but only wait till the talk is finished. The private call is one-to-one call between users, a user can talk to the one who he is intended to talk in the group without being heard by other users in the group. The trunking system based on CDMA standard adopts grouping data channels for trunking call service, i.e. to realize fast call setup by adopting Ethernet transmission, rather than the traditional circuit exchange in circuit domain. In order to meet the needs of trunking group call and private call, the trunking system based on CDMA standard adopts the method of fast call access. The features of the trucking communication system based on CDMA standard lie in that it adopts semiduplex communication mode, can realize a fast access and supports the group call, i.e. the calling mode of one-to-multi-users. In trunking communication, the users in the group are required to share the forward channel within a region. When users in the group are to call or talk, they only need to press PTT button, then they are able to talk with other users in the group. This type of PTT service is widely applied to intercommunication system and trunking system, providing command and dispatch functions for group users, such as police, fire-fighting, transportation and communication, air station and aviation, construction site, large-scale gathering, and military dispatching etc. With advancement of society, increase of population mobility, and fast development of mobile communication technology, the range of personal communication is becoming wider and wider. The application of trunking service also gradually turns to the individuals, for example, it may be applied in the chat among fashionable young peoples or small communities, and communications between family members. The trunking communication system based on CDMA standard can attract not only new individual users, but also some professional users for the operators.

The most important character of the trunking communication is that it requires short accessing time and quick acquisition of channel. But the traditional CDMA system adopts the method of serial acquisition. The base station subsystem sends out the Extended Channel Assignment Message (ECAM), then sends empty frames to terminal user on the service channel assigned; the terminal user processes the ECAM message, then turns to the forward service channel, and transmits the prefix-frame on the reverse channel after receiving at least two continuous valid empty frames; after acquiring the reverse channel, the base station subsystem sends Base Station Acknowledge Order (BSAckOrder) message to the terminal user, and points out in the Base Station Acknowledge Order message that the message needs to be verified; the terminal user responses by sending message of Terminal Acknowledge Order (MSACKOrder), and points out whether the message needs to be verified by the base station. The above procedures are on the premise that the terminal acquires the forward channel, if the terminal does not acquire the forward channel, it will not send the reverse prefix-frame. However, this type of serial procedure takes a long time for acquisition, and the signaling handshake can only be proceed after the whole acquisition process is finished. Moreover, the requirement of fast call setup in group call can not be satisfied due to the added time for establishing call. In addition, since trunking communication is mainly applied to emergent dispatch, such as the marine emergency, military dispatching, public security command and rush-to-danger dispatching, which are urgent and have high requirement on time, the call establishing time by the traditional cellular mobile communication system can only meet the requirements of common users, but not the trunking users' requirements on fast response. In order to meet the fast response requirement of the trunking communication, the ordinary call establishing procedure must be reformed to reduce the acquisition time, thereby meeting the fast call setup requirement of the digital trunking communication system. At present, there is still no effective method of fast call setup in the digital trunking system based on CDMA technology.

SUMMARY OF THE INVENTION

The present invention aims to provide a method of fast call setup in digital trunking communication system, so as to overcome the shortcoming of the existing technology that the digital trunking system based on CDMA standard can not realize the function of fast access and call, thereby realizing fast call setup.

In order to realize the above aims, the present invention provides a method of fast call setup in digital trunking communication system, including the following steps of:

Step 1, a terminal user initiating a PTT call;

Step 2, after receiving the PTT call request, a base station assigning channel resource for the call, establishing forward service channel according to the distribution of channel, transmitting empty frame on the forward service channel, and at the same time transmitting extended channel assignment message to specify the service channel assigned for the terminal;

Step 3, after receiving the extended channel assignment message, the terminal user opening a receiver to track and acquire the forward service channel, and at the same time transmitting one or more prefix-frames on reverse service channel or reverse pilot channel;

Step 4, the base station or the terminal performing the operation of acquiring service channel, if the acquisition succeeds, the call setup is successful, if the acquisition fails, the call setup is failed, and enter into release flow.

In the operation of acquiring service channel in step 4, if the base station acquires the reverse service channel first, said operation of acquiring service channel includes the following steps of:

step 4a, the base station transmitting a base station acknowledge order (BSAckOrder) message to the terminal, and requesting the terminal to return a verification;

step 4b, if the base station receives the message of acknowledge order (MSAckOrder) from the terminal, the acquisition of service channel is accomplished, the base station and the terminal access into the service channel, and the call setup is successful; if the base station does not receive the message of acknowledge order (MSAckOrder) from the terminal, the acquisition of service channel is failed, the call setup is failed, and enter into the release flow.

In the operation of acquiring service channel in step 4, if the base station acquires the forward service channel first, said operation of acquiring service channel includes the following steps of:

Step 4a', the terminal transmitting terminal message of acknowledge order (MSAckOrder) to the base station, and requesting the base station to respond;

step 4b', if the terminal receives the BSAckOrder message from the base station, the acquisition of service channel is accomplished, the base station and the terminal access into the service channel, and the call setup is successful; if the terminal does not receive the BSAckOrder message from the base station, the acquisition of service channel is failed, the call setup is failed, and enter into the release flow.

In the operation of acquiring service channel in step 4, if the base station and the terminal acquire corresponding reverse service channel and forward service channel simultaneously, the base station and the terminal mutually transmit verification to each other simultaneously, and respond to the verification mutually; if the base station and the terminal receive the verification message from each other respectively, the acquisition of service channel is accomplished, the base station and the terminal access into the service channel, and the call setup is successful.

The method of the present invention adopts a mode of overlapping of signaling handshake and channel acquisition, so as to advance the signaling handshake, reduce call accessing time, and realize the method of fast call setup. During the process of acquisition and access, the base station does not take the traditional method of sending empty frames, but adopts the way of sending the BSAckOrder signal directly in the acquisition process. After the mobile station receiving two continuous valid frames and the BSAckOrder message, it does not send the prefix-frame, but sends the MSAckOrder to response. By operating the signaling handshake in advance, the procedures of service channel acquisition and signaling handshake are operated simultaneously, so that the accessing time of trunking users is saved, and the shortcomings of the CDMA system that the accessing time is too long and can not meet the requirements of trucking service are overcome.

The technical schemes of the present invention is further described below in combination with the attached drawings and detailed embodiments.

PREFERRED EMBODIMENTS OF THE INVENTION

The present invention puts forward a method of parallel acquisition to realize the fast access of the trunking group call and the trunking private call. When a user presses PTT button to begin a PTT group call or a PTT private call, the base station of the BSS (Base Station Subsystem) receives the calling request, and assigns the channel resources for this call. The BSS establishes a forward service channel according to the assignment of the channel, and sends out an extended channel assignment message (ECAM) in the air to specify the service channel assigned for the terminal, at the same time, it sends out empty frames on the forward service channel. After the terminal receiving the ECAM, it turns on the receiver to trace and acquire the forward service channel, and at the same time, sends out a plurality of prefix-frames on the backward service channel or on the reverse pilot channel directly, without necessity to send the prefix-frames after receiving two continuous valid frames. At this moment, the base station and the terminal will send out the empty frames and the prefix-frames respectively. In the acquisition process, it is not always that the base station acquires the reverse service frames first, it is possible that the terminal acquires the forward service frames first. If the base station successfully acquires the frames prior to the terminal, it transmits the verification message BSAckOrder to the terminal first, and requires the terminal to verify the message, then the terminal feeds back reverse message MSAckOrder to the base station for verification after it receives the verification message from the base station; if the terminal successfully acquires the frames first, it transmits the verification message MSAckOrder to the base station subsystem first, and requires the base station to verify the message, then the base station feeds back the verification message BSAckOrder to the terminal for verification after it receives the verification message from the terminal. If the base station and the terminal acquire the frames simultaneously, it is possible that they will send out the verifications simultaneously, and response to the verifications mutually, which will slow down the process. But this situation rarely happens. As such, the whole procedure of acquiring service channel is accomplished, which is operated in parallel.

The present invention is applied in the trunking system based on CDMA standard to realize the fast call setup. It overcomes the disadvantage of time-consuming of the traditional serial acquisition and channel message verification mechanism of the one-way service, and adopts the method of parallel channel acquisition to reduce the time for user call accessing.

Figure 1:
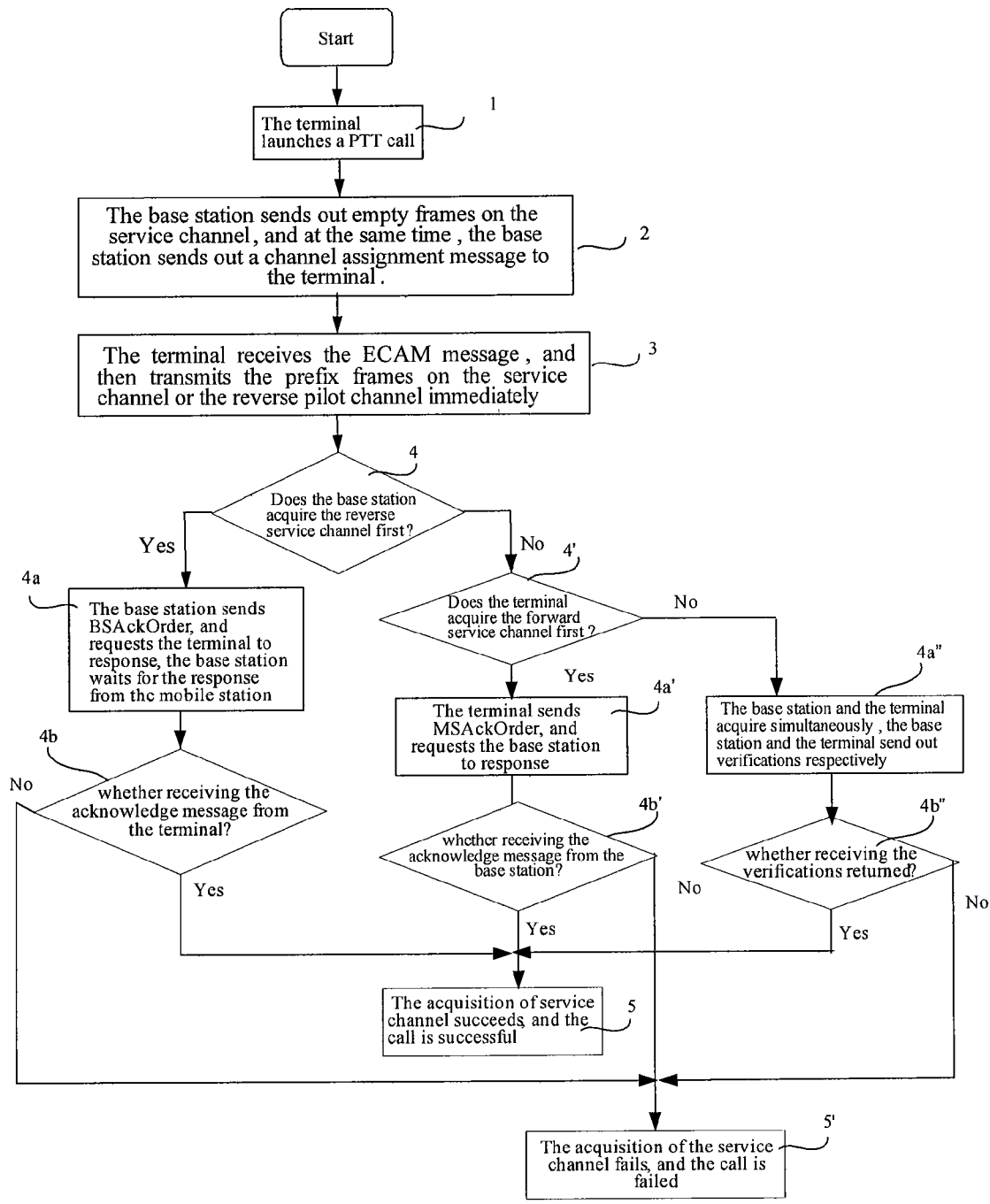
FIG. 1 is flowchart of the method of fast call setup in digital trunking system of the present invention.

The detailed flow is shown in FIG. 1:

Step 1, the terminal user pushes the PTT button to initiate a PTT call, and the PTT call can be group call or private call;

Step 2, the base station receives the call request, assigns channel resource, establishes forward service channel, and transmits empty frames on the service channel; in the meantime, the base station transmits extended channel assignment message ECAM to the terminal;

Step 3, the terminal receives the ECAM, then opens the receiver to track and acquire the forward service channel, and at the same time transmits prefix-frame on reverse service channel or reverse pilot channel;

Step 4, whether the base station acquires the reverse service channel first? If yes, turn to step 4a, if not, turn to step 4';

Step 4a, the base station transmits BSAckOrder message to the terminal, and requires the terminal to response, then it waits for the response from the terminal;

Step 4b, whether the base station receives the acknowledge message from the terminal? If yes, turn to step 5; if not, turn to step 5';

Step 4', whether the terminal acquires the forward service channel first? If yes, turn to step 4a', if not, turn to step 4a";

Step 4a', the terminal sends the MSAckOrder to the base station, and requests the base station to respond; the terminal waits for the response from the base station;

Step 4b', whether the terminal receives the acknowledge message from the base station? If yes, turn to step 5; if not, turn to step 5';

Step 4a", the base station and the terminal acquire the service channel simultaneously, the base station and the terminal send verifications mutually, and wait for the verification returned from each other;

Step 4b", whether the verifications return? If yes, turn to step 5; if not, turn to step 5';

Step 5, the service channel acquisition is accomplished, and the call is successful.

Step 5', the service channel acquisition is failed, and the call is failed.

Figure 2:
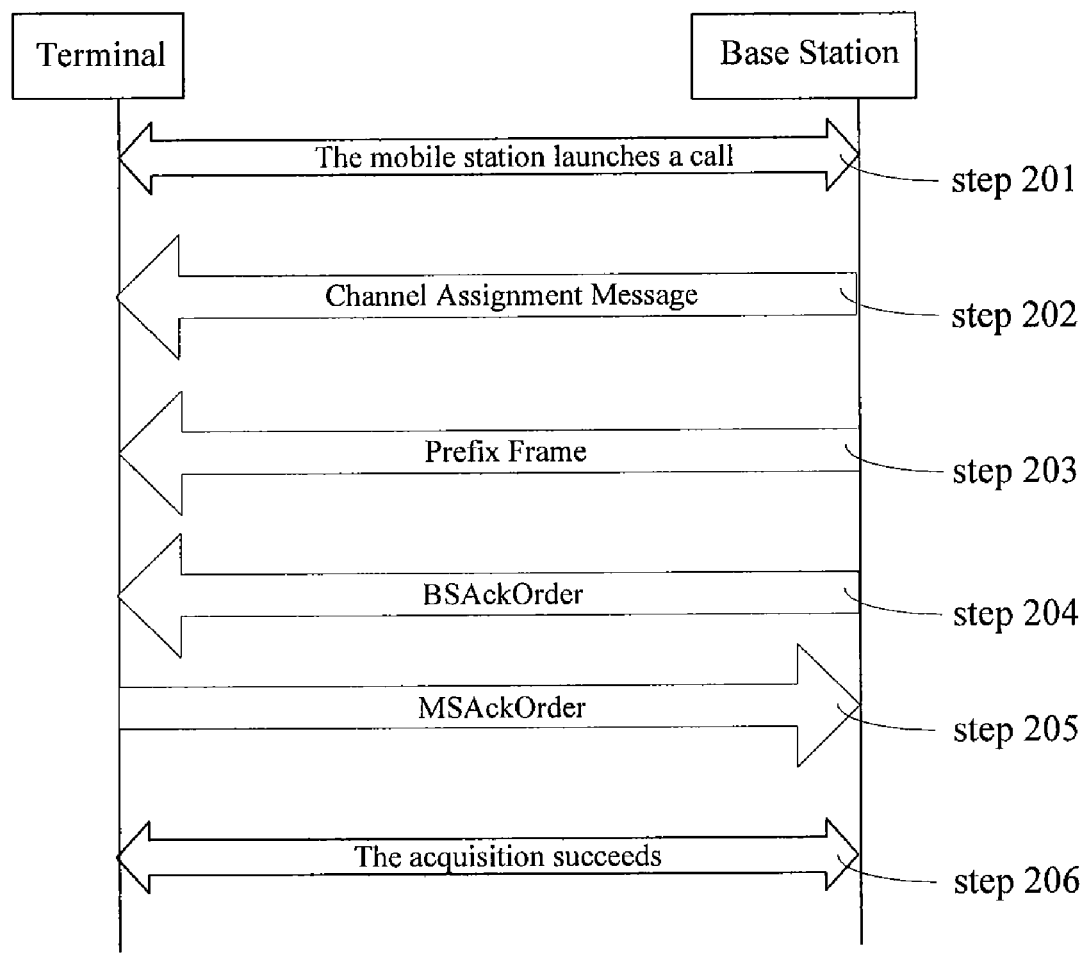
FIG. 2 is schematic view of message interaction according to an embodiment of the present invention.

FIG. 2 is the schematic view of message interaction according to the embodiment of the present invention that the base station successfully acquires reverse service channel first. The process of message interaction is as follows:

the terminal user pushes the PTT button to launch a group call request or a private call request to the base station (201);

the base station receives the call request for the group call or the private call, and judges whether it is a group call or a private call according to the SO (Service Option) of the call, the base station assigns channel resource and physical resource for the call, establishes the forward service channel based on the assigned resources, and sends empty frame on the forward service channel to the terminal;

the base station constructs the extended channel assignment message ECAM based on the calling type and the channel resource assigned, then transmits the channel assignment message on the paging channel to the terminal (202);

the terminal receives the extended channel assignment message ECAM from the base station, gets the channel attributes of the call, traces and acquires the forward service channel according to the channel attributes, and at the same time the terminal opens the transmitter to transmit the prefix-frame on the reverse service channel or the reverse pilot channel (203);

if the terminal is an IS95 terminal and the radio configuration is RC1 or RC2, the terminal transmits the prefix-frame on the reverse service channel;

if the terminal is a CDMA2000 terminal and the radio configuration is RC3, the terminal transmits the prefix-frame on the reverse pilot channel;

Up to this point, the terminal and the base station start to enter the stage of parallel channel acquisition, if the base station acquires the reverse service channel successfully, it sends the BSAckOrder message to the terminal and requires the terminal to verify the message; in the meantime, the base station sets timer in the LAC layer (204).

If such problem occurs that the base station does not receive the verification message from the terminal within the scope of the timer, then the channel acquisition fails, the call setup is failed, and enters release flow;

if the terminal receives the BSAckOrder message from the base station, and the message field ACK_REQ is 1, which indicates that the message from the base station needs a reverse verification, then the terminal sends MSAckOrder to the base station for verification (205), and if the MSAckOrder message does not need to be verified, its ACK_REQ is 0;

the base station receives the MSAckOrder message from the terminal, then the service channel acquisition is accomplished, the base station and the terminal access into the service channel, and the call setup is successful (206).

If the terminal receives two successive valid frames, but does not receive the BSAckOrder message from the base station, it means that the terminal acquires the channel prior to the base station, thereupon entering the flow that the terminal acquires the channel first, the processing manner is same with that of the base station: sending MSAckOrder message which requires for verification, and then setting the timer in LAC layer.

The trunking communication system based on CDMA standard adopts the technology of the third generation mobile communication system, having a large developing space in terms of technology and service; the method of the present invention is based on the mature CDMA technology, it only modifies the application of the air interface rather than changing the physical mechanism of the air interface. The present invention adopts the method of parallel acquisition, thereby speeding up the call setup. The present invention not only satisfies the requirement on time for the fast call setup in the trunking system based on CDMA standard, but also is valuable in accelerating the call setup in the common CDMA2000 system.

Finally, it needs to be pointed out that the above embodiments are for illustrating the technical schemes of the present invention, they are not limitations to the present invention. Although the present invention is described in detail by referring to the above preferred embodiments, people skilled in the art should understand that amendments and equal replacements can be made to the technical schemes of the present invention under the spirit and scope of the technical schemes of the present invention, and all such amendments and equal replacements should be covered in the scope of the claims of the present invention.

What we claimed is:

1. A method of fast call setup in digital trunking communication system, comprising the steps of:
    1) initiating, by a terminal, a request for a push-to-talk (PTT) call;
    2) receiving, by a base station, the request for the PTT call; assigning by the base station a channel resource for the PTT call, in order to establish by the base station a forward service channel in accord with a distribution of channels, transmitting at a same time by the base station:
one or more empty frames on the forward service channel; and
an extended channel assignment message to specify a service channel assigned for the terminal;
3) receiving by the terminal the extended channel assignment message, then at the same time:
opening by the terminal a receiver to track and acquire the forward service channel; and
transmitting by the terminal one or more prefix-frames; and
4) attempting by the base station and the terminal to acquire service channels simultaneously, so as to complete the call setup, wherein if the attempting to acquire the service channels fails, the channel resource for the PTT call is released.

2. The method of fast call setup in digital trunking communication system of claim 1, wherein, in the step 4) of attempting by the base station and the terminal to acquire the service channels simultaneously, if the base station acquires a reverse service channel first, the method further comprises the steps of:
4a) transmitting by the base station a base station acknowledge order (BSAckOrder) message to the terminal and a request by the base station for the terminal to return a verification message; and
4b) receiving by the base station a message of acknowledge order (MSAckOrder) from the terminal, for access by the base station and the terminal into the service channels respectively, in order for the call setup to be completed, wherein if receipt by the base station of the message of acknowledge order (MSAckOrder) from the terminal fails, the channel resource for the PTT call is released.

3. The method of fast call setup in digital trunking communication system of claim 2, wherein:
step 4a) further comprises the base station sending the BSAckOrder message to the terminal, and at the same time, the base station setting and beginning a timer in a LAC layer;
step 4b) further comprises, if the base station receives the message of acknowledge order (MSAckOrder) from the terminal within the timing range of the timer, acquiring the service channels by the base station and the terminal, wherein both the base station and the terminal access into the service channels, in order to complete the call setup,
wherein if the base station does not receive the message of acknowledge order (MSAckOrder) from the terminal within the timing range of the timer, the call setup is failed, and the channel resource for the PTT call is released.

4. The method of fast call setup in digital trunking communication system of claim 1, wherein, in the step 4) of attempting by the base station and the terminal to acquire the service channels simultaneously, if the terminal acquires the forward service channel first, the method further comprises the steps of:

4a') sending by the terminal a terminal message of acknowledge order (MSAckOrder) to the base station and a request by the terminal the base station to respond; and
4b') if receiving by the terminal a base station acknowledge order (BSAckOrder) message, to access by the base station and the terminal into the service channels respectively, in order for the call setup to be completed,
wherein if receipt by the terminal the BSAckOrder message from the base station fails, then the call setup is failed and the channel resource for the PTT call is released.

5. The method of fast call setup in digital trunking communication system of claim 4, wherein:
step 4a') further comprises the terminal sending the terminal message of acknowledge order (MSAckOrder) to the base station, and at the same time, the terminal setting and beginning a timer in a LAC layer;
step 4b') further comprises, if the terminal receives the message of acknowledge order (BSAckOrder) from the base station within the timing range of the timer, acquiring the service channels by the base station and the terminal, wherein both the base station and the terminal access into the service channels, in order to complete the call setup,
wherein if the terminal does not receive the BSAckOrder message from the base station within the timing range of the timer, the call establishment is failed, and the channel resource for the PTT call is released.

6. The method of fast call setup in digital trunking communication system of claim 1, wherein, in the step 4) of attempting by the base station and the terminal to acquire the service channels simultaneously, if the base station and the terminal acquire the corresponding reverse service channel and forward service channel simultaneously, the method further comprises:
mutually and simultaneously sending, by the base station and the terminal verification messages; and
responding to the verification messages from the other side respectively,
wherein when the base station and the terminal receive the responses transmitted by the other side respectively, the base station and the terminal access into the service channels respectively, and the call setup is completed.

7. The method of fast call setup in digital trunking communication system of claim 1, wherein, in the step 3) of transmitting by the terminal one or more prefix-frames:
if the terminal is an IS95 terminal and the radio configuration is RC1 or RC2, the terminal sends the one or more prefix-frames on a reverse service channel; and
if the terminal is a CDMA2000 terminal and the radio configuration is RC3, the terminal sends the one or more prefix-frames on a reverse pilot channel.

8. The method of fast call setup in digital trunking communication system of claim 1, wherein, in the step 1), the request for the PTT call is one of a group call request and a private call request.

* * * * *